United States Patent
Hehn et al.

(10) Patent No.: US 10,271,246 B2
(45) Date of Patent: Apr. 23, 2019

(54) METHOD FOR TRANSFERRING A MOBILE NETWORK SUBSCRIBER STATION IN A HANDOVER PROCESS IN A MOBILE NETWORK, MOBILE NETWORK SUBSCRIBER STATION, AND MOBILE NETWORK MANAGEMENT UNIT FOR USE IN THE METHOD AND VEHICLE

(71) Applicant: VOLKSWAGEN AG, Wolfsburg (DE)

(72) Inventors: Thorsten Hehn, Wolfsburg (DE); Ernst Zielinski, Bochum (DE); Steffen Schmitz, Wesel (DE); Andreas Kwoczek, Lehre (DE); Teodor Buburuzan, Braunschweig (DE); Roman Alieiev, Stendal (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 15/844,670

(22) Filed: Dec. 18, 2017

(65) Prior Publication Data
US 2018/0184339 A1 Jun. 28, 2018

(30) Foreign Application Priority Data
Dec. 22, 2016 (DE) .................. 10 2016 226 045

(51) Int. Cl.
*H04W 36/00* (2009.01)
*H04W 72/10* (2009.01)
(Continued)

(52) U.S. Cl.
CPC ......... *H04W 36/0033* (2013.01); *H04W 8/08* (2013.01); *H04W 36/08* (2013.01);
(Continued)

(58) Field of Classification Search
CPC . H04W 36/0033; H04W 36/08; H04W 76/12; H04W 8/08; H04W 72/10;
(Continued)

(56) References Cited

U.S. PATENT DOCUMENTS 6,385,454 B1    5/2002 Bahl et al.
6,965,827 B1 *  11/2005 Wolfson ............. G01C 21/3415
                                                   340/992

(Continued)

FOREIGN PATENT DOCUMENTS

DE    102012019185 A1    4/2014
DE    102013215730 A1    2/2015
(Continued)

OTHER PUBLICATIONS

Römer et al.; Capacity Monitoring in the Context of Network Planning for Telecommunications Networks; Know Today; vol. 63, No. 6; 2010; pp. 19-24.

*Primary Examiner* — Khai M Nguyen
(74) *Attorney, Agent, or Firm* — Barnes & Thornburg LLP

(57) ABSTRACT

A mobile communication handover method which takes into account information about special equipment of the mobile telephone network subscriber station during a handover process for the mobile telephone network subscriber station wherein information about special equipment of the mobile telephone network subscriber station is transmitted from the mobile telephone network subscriber station to a mobile telephone network management unit, which takes the information about the special equipment into account during the handover process.

11 Claims, 4 Drawing Sheets

(51) Int. Cl.
*H04W 36/08* (2009.01)
*H04W 8/08* (2009.01)
*H04W 76/12* (2018.01)

(52) U.S. Cl.
CPC ........... *H04W 72/10* (2013.01); *H04W 76/12* (2018.02); *Y02D 70/00* (2018.01); *Y02D 70/1242* (2018.01); *Y02D 70/1262* (2018.01); *Y02D 70/142* (2018.01); *Y02D 70/168* (2018.01); *Y02D 70/21* (2018.01)

(58) Field of Classification Search
CPC .... Y02D 70/10; Y02D 70/168; Y02D 70/142; Y02D 70/21; Y02D 70/00; Y02D 70/1262; Y02D 70/1242
See application file for complete search history.

(56) References Cited

U.S. PATENT DOCUMENTS

| | | | | |
|---|---|---|---|---|
| 2007/0142050 | A1* | 6/2007 | Handforth | H04W 36/32 455/436 |
| 2011/0164588 | A1* | 7/2011 | Kwon | H04W 36/0022 370/331 |
| 2018/0184339 | A1* | 6/2018 | Hehn | H04W 72/10 |

FOREIGN PATENT DOCUMENTS

| | | | |
|---|---|---|---|
| EP | 1349409 | A1 | 10/2003 |
| EP | 2088818 | A2 | 8/2009 |
| EP | 2417800 | A1 | 2/2012 |
| GB | 2496165 | A | 5/2013 |
| JP | 2013172407 | A | 9/2013 |

* cited by examiner

METHOD FOR TRANSFERRING A MOBILE NETWORK SUBSCRIBER STATION IN A HANDOVER PROCESS IN A MOBILE NETWORK, MOBILE NETWORK SUBSCRIBER STATION, AND MOBILE NETWORK MANAGEMENT UNIT FOR USE IN THE METHOD AND VEHICLE

PRIORITY CLAIM

This patent application claims priority to German Patent Application No. 10 2016 226 045.6, filed 22 Dec. 2016, the disclosure of which is incorporated herein by reference in its entirety.

SUMMARY

Illustrative embodiments relate to a method for transferring a mobile telephone network subscriber station during a handover process in a mobile telephone network. Illustrative embodiments also relate to a mobile telephone network subscriber station and a mobile telephone network management unit for use in the method, and a vehicle.

BRIEF DESCRIPTION OF THE DRAWINGS

An exemplary embodiment is depicted in the drawings and will be explained in greater detail below based on the figures.

The following are shown.

DETAILED DESCRIPTION

Figure 1:
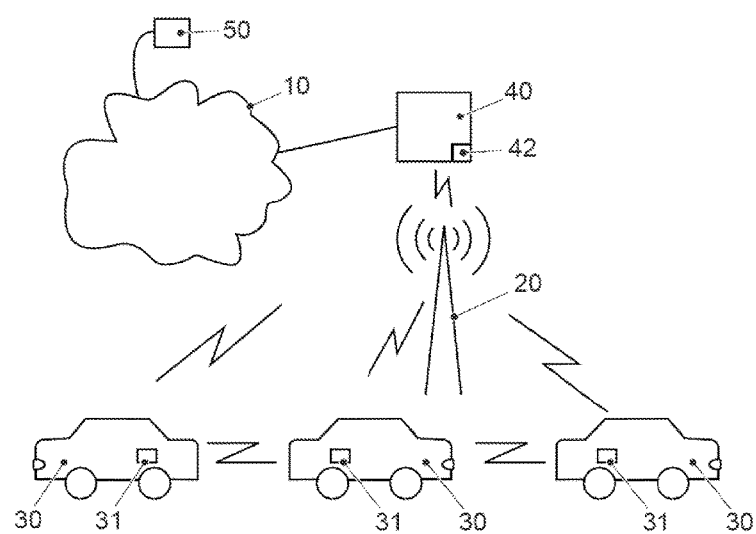
FIG. 1 shows the principle of vehicle communication via mobile radio.

For the scenario in which vehicles equipped with radio communication modules communicate directly with one another in road traffic, whether for cooperative or autonomous driving, or for subscribing to mobile radio and connecting to the Internet or being provided with other data services, high reliability in safety-critical applications is indispensable or is highly important to the customer.

Vehicle communication is also possible in the field of mobile telephone networks. However, with this technique, the base station must convey the messages from vehicle to vehicle. This is the field in which the communication takes place in the so-called 'infrastructure domain'. In the upcoming mobile radio generation, direct vehicle communication will be possible. In LTE, this is called LTE-V; in the 5G initiative, this is called D2D.

Typical communication scenarios include safety scenarios, traffic efficiency scenarios, and infotainment. The following scenarios are mentioned for the safety domain: 'cooperative forward collision warning', 'pre-crash sensing/warning', 'hazardous location warning'. In these domains, the vehicles exchange information such as position, direction and speed, as well as parameters such as size and weight. Additional information which is transmitted relates to information concerning intent, for example, the vehicle intends to pass, the vehicle is turning left/right, etc., the information being of interest for cooperative driving. In addition, sensor data are often transmitted. If a hazardous situation exists and the driver does not respond, the automobile could automatically brake to prevent an accident or at least to minimize the consequences of an unavoidable accident.

The following are mentioned in the domain of traffic efficiency: 'enhanced route guidance and navigation', 'green-light optimal speed advisory', 'V2V merging assistance' and 'platooning'. Platooning is an application defined as intelligent driving in a convoy, and is also known as 'high-density platooning'. In this case, the distances between the vehicles in the convoy, for example, trucks, are adapted to the particular traffic situation and controlled. This minimizes the distance between the convoy vehicles to reduce energy consumption. To do this, messages must be constantly exchanged between the convoy vehicles.

In the domain of infotainment, Internet access is of primary importance.

Currently, the following mobile radio technologies are applicable to vehicle communication: 3GPP-based UMTS, HSPA, LTE, and the upcoming 5G standards. For direct vehicle communication, LTE-V and 5G D2D are mentioned.

For transmitting data in a periodic, recurring manner, it is more efficient to reserve transmission resources for the transmission of these data and to allocate these transmission resources to the transmitting station. In the current mobile radio standards, a management unit, also known as a scheduler, assumes this task. Today, this management unit is typically arranged in the mobile radio base station. In the LTE mobile communication system, the base station is referred to as an 'evolved node' base station, in short eNodeB.

When carrying out direct mobile-radio communication between vehicles (LTE-V, 5G), the situation thus exists in which transmission takes place from vehicle to vehicle, but the network provider controls the resources via the eNodeB base station.

In mobile radio, all activities of the users within a cell are orchestrated by the base station. The scheduler, which is generally a software component in the base station, informs each subscriber of the time and the transmission frame frequencies at which the subscriber is allowed to transmit certain data. The primary task of the scheduler is thus to suitably allocate the transmission resources to the various subscribers. As a result, collisions are prevented, the data traffic is controlled in both transmission directions, from one subscriber (uplink) and to another subscriber (downlink), and efficient access is made possible to a plurality of users. For direct vehicle communication, the scheduler determines the frequency resource which may be used for the direct communication, and the time at which it may be used.

Up to now, the network resources have been reserved as a function of the current demand and the current position of the mobile telephone network subscriber station.

The handover process is an important process with respect to mobile communication in a mobile telephone network. The mobile telephone network is a cellular network which is divided into mobile radio cells. Each mobile radio cell is served by a base station. In the handover process, also referred to as a connection transfer process, a mobile telephone network subscriber station is transferred from one radio cell to another during a telephone call or a data connection, without interrupting this connection.

Typically, a handover process (national roaming) is carried out as a function of the channel quality and the status of the mobile radio network (quality of the radio channel, the degree of utilization of the currently used cell, and the distance from the base station). The most frequent reason for changing radio cells in a cellular network is when subscriber station UE (user equipment) reaches the edge of the service area of the associated base station (eNodeB) due to movement, and moves into the service area of an adjacent mobile radio cell. This subscriber station is then transferred from the mobile telephone network operator to another base station with which it is to be connected to continue to remain linked to the network.

The typical handover processes specified in the mobile radio standard are based on measurements of the field strength or other parameters which describe the quality of the communication channel, also known as the channel quality indicator (CQI) report.

From U.S. Pat. No. 6,385,454 B1, an approach for a handover strategy is known, in which the current route of a mobile telephone network subscriber station is estimated by the registration of earlier movements (routes) of a mobile telephone network subscriber station, and the estimated route for the handover process is utilized.

From GB 2 496 165 A1, it is also known to communicate future trajectories and movements of the subscriber station to a mobile telephone network management unit and to take it into account for resource planning. This route information originating from a navigation system of the mobile radio subscriber and transmitted to the mobile radio operator is also utilized for the handover process. The mobile telephone network management unit which processes the route information is referred to in the document as the vehicle location control entity (VLCE).

From documents EP 2 088 818 A2 and JP-A-2013-172 407, other handover systems for mobile radio are known in which the route information of a mobile radio subscriber is taken into account.

Disclosed embodiments improve the handover process. An improved anticipatory handover process is to be achieved. Here, the focus is placed on the requirements of individual transport. An ever-increasing number of cooperatively or autonomously controlled vehicles are in transit on the roads. Therefore, it is necessary to exchange an increasing amount of data between the mobile telephone network and the vehicles, and also between the vehicles themselves. Because of this alone, network utilization is increasing drastically, and bottlenecks and overloading of radio cells may occur. Some applications require stable connections. An improved handover process is important for this as well. In addition, media consumption and information requirements of vehicle passengers increase if the driver is relieved of the task of driving the vehicle.

The approach consists of taking into account at least one additional parameter during the handover process. The additional parameter relates to the equipment of the vehicle or the vehicle category. A variety of components are installed in today's vehicles, depending on the equipment variation. A variety of sensors are installed in the vehicle, depending on the equipment variation. Typical sensors include wheel rotational speed sensors, steering angle sensors, acceleration sensors, rotational rate sensors, tire pressure sensors, distance sensors, etc. These are conventional sensors which have been recently provided in most equipment variations. Other sensors include, for example, cameras and radar and lidar systems which, for example, are used for the lane departure warning system, monitoring the lane condition, or for distance warning. Such sensors are currently found only in certain equipment variations of the vehicles.

The newly developed systems for cooperative driving or autonomous driving are designed in such a way that the vehicles monitor one another and also provide reciprocal notification about certain observations. For this purpose, sensor data or monitoring data derived therefrom are then exchanged between the vehicles. When the data of camera, radar or lidar sensors are transmitted, a large quantity of data accumulates which must be transferred. The transmission of these data may also relate to a longer monitoring period. Since the vehicle continues to travel during this period, there may also necessarily be a handover process. According to the proposal, it is provided that the sensor equipment is taken into account during the handover process. This is beneficial if, during the handover process, multiple mobile radio cells are available with which the vehicle may be registered. According to the proposal, the handover process may then take place taking into consideration the sensor equipment in such a way that the vehicle is transferred to the mobile radio cell in which the transmission of the sensor data may reliably continue. Thus, mobile radio cells are avoided which are already so heavily utilized that the reliable transmission of the sensor data does not seem to be possible.

As a result of route information about a planned travel route of a mobile telephone network subscriber station being transmitted to a mobile telephone network management unit, the handover process may be further improved in that it is enhanced by an anticipatory component.

The mobile telephone network management unit may transmit the information about the special equipment of the mobile telephone network subscriber station, before or during the handover process, to a handover control unit which is located in the vicinity of the base station with which the mobile telephone network subscriber station is registered. During the handover process, this handover control unit typically acts in cooperation with the mobile telephone network subscriber station. In this case, it is not necessary to transmit the data to the mobile telephone network management unit which centrally manages the route information of the mobile telephone network subscriber stations.

The method may be enhanced. In this case, the information about the special equipment of the mobile telephone network subscriber station may be linked to information about a priority, in particular for emergency vehicles in the categories of police vehicles, fire department vehicles, ambulances, emergency physician vehicles, military vehicles, technical assistance, or local public transportation vehicles. It is beneficial if the information about the priority is taken into account during the handover process in such a way that the transmission resources may be allocated to the mobile telephone network subscriber station. These vehicles then always have the best link to the mobile telephone network during their deployment.

It is also beneficial to the mobile telephone network subscriber station if the station is equipped with a buffer memory in which the data generated in the special equipment are buffered if, during the handover process, no mobile radio cell is available which is suitable for transmitting the data about the special equipment. The data are then still available when the mobile telephone network subscriber station is ultimately transferred to a mobile radio cell which is suitable for transmitting the data about the special equipment.

The following description illustrates the principles of the disclosure. It is hereby to be understood that those skilled in the art will be capable of designing various arrangements which are not explicitly described here, but which incorporate principles of the disclosure, and which are also to be protected in terms of their scope.

FIG. 1 shows the principle of vehicle communication by mobile radio. The vehicles are provided with the reference numeral 30.

The term 'vehicle' is to be understood as a general term, whether for motor vehicles including an internal combustion engine or an electric motor, for bicycles with and without an electric motor, or other vehicles driven by muscle power, for vehicles having one, two, four or more wheels, or for motorcycles, passenger cars, trucks, buses, farming vehicles, or construction machinery. This enumeration is not exhaustive and also comprises other vehicle categories.

The vehicles in FIG. 1 are respectively equipped with an on-board unit 31 which acts as a transceiver unit for communication in a mobile telephone network. This on-board unit is part of a mobile telephone network subscriber station in the context of the disclosure. All messages from the vehicles (uplink) and to the vehicles (downlink) are either managed via a base station 20 which operates a mobile radio cell, or, in the case of direct vehicle communication (sidelink), are exchanged directly between the vehicles. If the vehicles are within this mobile radio cell, they are logged onto or registered with the base station 20. If they leave this mobile radio cell, they are transferred to the adjacent cell (handover) and are accordingly logged off or deregistered from the base station 20. The base station 20 also provides access to the Internet, so that the vehicles 30 and all other mobile radio subscribers in the mobile radio cell are provided with Internet data. For this purpose, the base station 20 is connected to the EPC 40 (evolved packet core) via the so-called S1 interface. Another central computer 50 of the mobile radio provider is available, which is accessible via the Internet 10 or another wide area network WAN, and which acts as a mobile telephone network management unit in the context of the disclosure. This central computer 50 assumes the task of network resource planning. The network resource planning optimizes the network utilization, so that as many subscribers as possible may be provided with data, and overloads or bottlenecks in mobile radio cells may be prevented. An overview of the existing methods of capacity monitoring when planning mobile radio networks may be found in the overview article 'Kapazitätsmonitoring im Rahmen der Netzplanung für Telekommunikationsnetze' (capacity monitoring within the scope of network planning for telecommunications networks) by S. Römer and R. Larres in WissenHeute, volume 63, 6/2010. User behavior is measured and is resolved temporally and spatially. In addition, the daily, weekly and monthly cycles are measured and statistically evaluated to be able to make forecasts. Further traffic growth is also taken into account in a traffic forecast for planning network expansion.

Such mobile radio technologies are standardized, and in this connection, reference is made to the relevant specifications of mobile radio standards. Reference is made to the 3GPP initiative and the LTE (long-term evolution) standard as a modern example of a mobile radio standard. Many of the associated ETSI specifications are currently available in Version 13. The following are mentioned as examples: ETSI TS 136 213 V13.0.0 (2016-05); Evolved Universal Terrestrial Radio Access (E-UTRA); physical layer procedures (3GPP TS 36.213 version 13.0.0 release 13).

LTE is associated with high transmission rates and short response times. The increase in the transmission rate with LTE is achieved via improved modulation methods, more flexible frequency utilization, and higher channel bandwidths. According to the specification, LTE is currently achieving a downlink transmission rate of over 300 MBit/s and an upload rate of 75 MBit/s per 20-MHz band, according to calculations and minus overhead.

The transmission speed of LTE is essentially a function of the frequency band, the channel width, the distance from the base station 20, and the number of subscribers within the mobile radio cell. The greater the number of users utilizing the bandwidth simultaneously, the lower the transmission rate is per subscriber.

The frequency band around 800 MHz was originally provided for analog UHF television channels. As a result of the switchover of terrestrial TV reception to DVB-T/DVB-T2 and the associated decommissioning of analog television transmission via radio, this frequency band became free. This frequency band is therefore also referred to as the digital dividend. In addition, frequencies in the frequency band around 1800 MHz are available to all network providers and may be used for LTE.

While the frequencies around 2600 MHz are used primarily at heavily frequented sites (hotspots) in large cities, the mobile radio operators are required to provide the white spaces of the broadband expansion (unserved areas) with the 800 MHz frequency band. Depending on requirements and demand, it is to be expected that at some point, this frequency band will be overcrowded, and that the frequencies around 2600 MHz will also have to be provided for applications in rural areas.

However, the higher frequency band has a shorter range. Of the three frequency bands, the 800 MHz band provides the longest range and requires fewer base stations for network coverage. However, with LTE, the distance between the base station and the terminal device cannot be more than 10 kilometers.

For multiple mobile radio devices to be able to transmit data simultaneously, LTE operates using scalable, individual channels. Specifically, in terms of resource allocation, this means that the frequency spectrum is shared, and portions of the spectrum are allocated to individual devices for a certain period.

The OFDMA (orthogonal frequency-division multiple access) technique is used for the downlink. There, the known OFDM (orthogonal frequency-division multiplexing) multicarrier transmission technique is used, in which data symbols are modulated onto the individual carriers by QPSK (quadrature phase-shift keying) or QAM (quadrature amplitude modulation). With OFDMA, the available frequency band is divided into many narrow bands (channels). The bandwidth is utilized flexibly to maximize the transmission performance of the frequencies.

A frequency band having a bandwidth of 10, 15 or 20 MHz is divided into 15-kHz subcarriers. Twelve subcarriers are combined into a respective resource block (RB), which is the smallest unit which can be allocated to an LTE device. A device may use one or multiple resource blocks per direction. The number depends on the utilization of the cell and the signal quality. The upper limit is obtained from the width of the frequency block which the base station uses. For a 10-MHz frequency block, it is 50 resource blocks. For 20 MHz, it is 100.

Temporally, the transmission of a block is fixed at 10 ms (frame). That is 100 blocks per second. In turn, each frame is made up of 10 subframes. One transport block may be transmitted per subframe. Its size varies depending on the signal quality. The size of the transport block is essentially a function of the signal quality, but is also a function of the quantity of data requested by the subscriber station. The signal quality determines the type of modulation used, the ratio between useful data and error correction (code rate), and the number of resource blocks used. These three parameters are directly related.

Special algorithms select the suitable channels and take the environmental influences into account. Optionally, only those carriers are used for transmission which are the most beneficial for the user at the user's respective location.

The SC-FDMA (single-carrier frequency division multiple access) technique is used for the uplink. It is a single-user access method which is otherwise highly similar to OFDMA. SC-FDMA has fewer power fluctuations and allows for simpler power amplifiers. This spares mobile device batteries.

LTE also operates using spatially separate data streams. The LTE specification provides for four antennas in the base station and two antennas in the terminal devices. The transmission signal is conveyed to multiple transmitting antennas for transmission. The reception signals are received by two antennas. This technique is referred to as multiple input-multiple output (MIMO). In Tx mode, a better signal is calculated from the two signals. Thus, better data throughput is achieved, since the two transmission and reception paths are not subject to the same disturbances (losses and interference). In addition, LTE uses other techniques such as the shared-channel principle, as well as hybrid automatic repeat request (HARQ) and adaptive modulation and coding (AMC).

Figure 2:
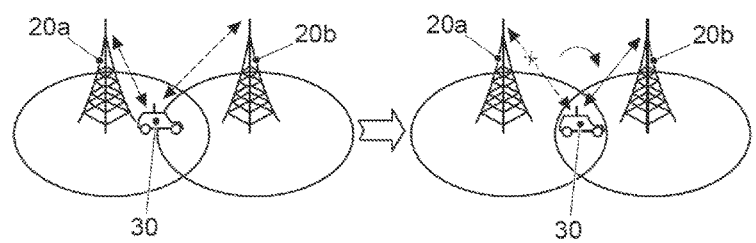
FIG. 2 shows the typical sequence of the handover process in which a mobile telephone network subscriber station is transferred from one mobile telephone cell to the next mobile telephone cell.

The principle of the handover process is shown in FIG. 2. There, two adjacent base stations 20 are shown, between which a vehicle 30 is traveling. In the illustration, the vehicle 30 is moving from left to right. At the start of the handover process, the vehicle 30 is registered as a mobile telephone network subscriber station at base station 20a. As it approaches base station 20b, it receives signals from base station 20b and also starts communicating with it. If the reception signal is strong enough and the reception signal from base station 20a has simultaneously fallen below a threshold value, registration with the radio cell of base station 20b is carried out, and deregistration from base station 20a is subsequently carried out. This process is depicted in the right-hand portion of FIG. 2.

Various handover techniques exist, of which a few will be described briefly:

Differentiation according to the type of connection transition

Hard Handover

The existing connection to the current cell is completely terminated before the connection to the new cell is established. Since adjacent GSM cells use different radio frequencies, GSM handovers are always hard handover techniques. The mobile radio device must switch the transmission and reception frequencies during the handover process.

Soft Handover

The connection to the new cell is established before the existing connection is terminated. Two simultaneous connections to different cells exist for a certain period. This method is used, for example, with UMTS. Here, adjacent cells generally use the same radio frequencies.

The initiation of a handover process may take place in different ways. Nonetheless, these techniques have in common the collection of measurement data for carrying out the handover process. A differentiation is made, for example, between the following handover techniques:

a) Mobile-Assisted Handover (MAHO)

All handover processes which are carried out in the GSM network are exclusively of the MAHO type. The execution of a handover is decided and commissioned by the BSC, but is based on the measurement results of the BSC and the mobile telephone network subscriber station MS. Even the nearest cell, which has been selected for the handover, is based on the detected measurement data of the mobile telephone network subscriber station MS. The BSC detects a degradation of the signal level and prepares the change-over for the mobile telephone network subscriber station MS.

b) Network-Controlled Handover (NCHO)

The NCHO technique was deployed in the analog networks, for example, C-Netz, as of 1984. Here, the initiation of a handover process took place based on measurements made by the base station, which forwarded the call to the next station.

c) Mobile-Controlled Handover (MCHO)

As the name implies, with the MCHO technique, a handover process is carried out by the mobile telephone network subscriber station itself. This type of handover technique is difficult to control in the mobile radio sector and is therefore not practicable. It is therefore used primarily in system architectures in which the number of mobile stations is known from the start, for example, in DECT devices or WLAN networks.

The terminal device continuously makes measurements of the signal strength and quality of the current cell and of the field strength of the adjacent cells; in the case of GSM, it measures the reception signal strength of the broadcast control channel (BCCH). The measurement results are transmitted to the base station controller (BSC) (every 480 ms in the case of GSM). The BSC then makes the decision about the necessity of a handover. Before the handover can be carried out, a suitable channel must be reserved by the BSC which is responsible for the target cell. The BSC can give the mobile telephone network subscriber station the handover command only if this was successful.

In most mobile radio systems, there is a range of system parameters which influence the start and the course of a handover. The comparisons which are to be made differ according to the type of handover. In UMTS, for instance, the quality of the radio connection (call quality) may be improved at the expense of the network capacity, in that the mobile station is more frequently in soft handover, i.e., more frequently connected to multiple base stations simultaneously. A simultaneous improvement of the quality of the radio connection and the network capacity may, for example, be achieved by optimizing the base station antenna parameters.

With respect to the details of the handover process for LTE, reference is made to the standard. The protocol for the handover process is described in the specification ETSI TS 136 413 V12.3.0 (2014-09); Evolved Universal Terrestrial Radio Access Network (E-UTRAN); S1 Application Protocol (S1AP) (3GPP TS 36.413 version 12.3.0 release 12).

Figure 3:
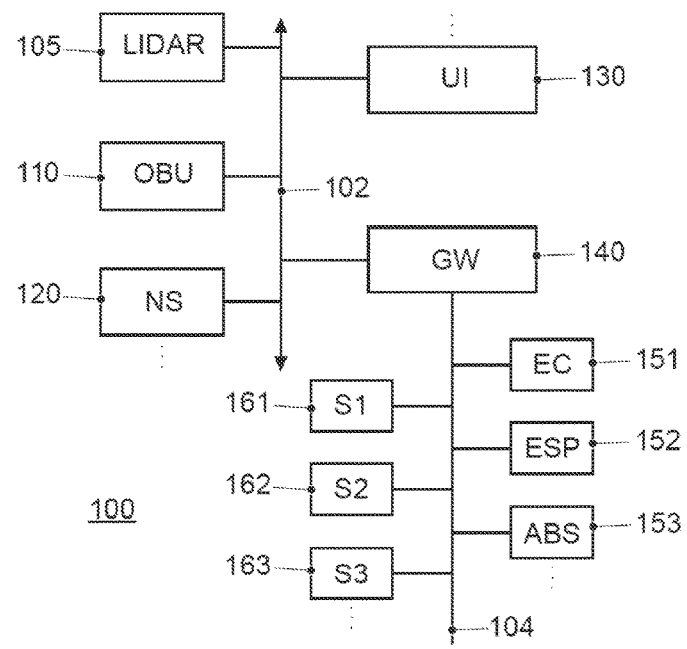
FIG. 3 shows a block diagram of the vehicle electronic system of a motor vehicle.

FIG. 3 shows the typical structure of a motor vehicle electronic system 100 of a modern motor vehicle 30. An engine control unit is designated by the reference numeral 151. The reference numeral 152 corresponds to an ESP control unit, and the reference numeral 153 refers to an ABS control unit. Additional control units such as the transmission control unit, airbag control unit, etc., may be present in the motor vehicle. The networking of such control units typically takes place using the CAN (controller area network) bus system 104, which is standardized as ISO standard ISO 11898. Since various sensors are installed in the motor vehicle, and these are no longer connected only to individual control units, such sensor data is also transmitted via the bus system 104 to the individual control units. Examples of sensors in the motor vehicle include wheel rotational speed sensors, steering angle sensors, acceleration sensors, rotational rate sensors, tire pressure sensors, distance sensors, etc. The various sensors with which the vehicle is equipped are indicated in FIG. 3 by the reference numerals 161, 162, 163.

However, modern vehicles may include additional components such as video cameras, for example, acting as a reversing camera or as a driver monitoring camera, or also as a front camera to monitor traffic events. Examples of additional components include a radar device for implementing a radar cruise control or for implementing a distance warning device or a collision warning device.

For several years, driver assistance systems have been provided which detect the driving environment using radar, lidar, or video sensors, form an internal representation of the driving situation via interpretation of these sensor data, and building on this knowledge, carry out increasingly demanding functions by providing information and warnings to the driver, and even selectively intervening into the vehicle guidance. Thus, for example, longitudinal guidance on well-structured roads such as motorways may be automatically carried out for a large percentage of time via an ACC (adaptive cruise control) system equipped with lidar sensors and/or radar sensors. In FIG. 3, as an example, a lidar sensor is provided with the reference numeral 105.

Other electronic devices are also situated in motor vehicles. These are arranged more in the area of the passenger compartment and are often operated by the driver. Examples include a user interface device via which the driver may select driving modes, but may also operate conventional components. These include gear selection, as well as blinker control, windshield wiper control, light control, etc. This user interface arrangement is provided with the reference number 130. The user interface arrangement 130 is often equipped with a rotary/pushbutton switch via which the driver is able to select the various menus which are shown on a display in the cockpit. On the other hand, a touch-sensitive display also falls into this category. Even speech input for providing operational assistance falls into this domain.

A differentiation therefrom is often made with respect to a navigation system 120, which is also integrated into the area of the cockpit. The route which is displayed on a map may of course also be depicted on the display in the cockpit. Additional components such as a hands-free device may be present but are not depicted in greater detail. The reference number 110 refers to another on-board unit. This on-board unit 110 corresponds to a communication module via which the vehicle can receive and transmit mobile data. As described, this may be a mobile radio communication module, for example, according to the LTE and LTE-V standards.

The devices of the passenger compartment are also networked together via a bus system which is designated by the reference number 102. This may, for example, be the high-speed CAN bus system according to the ISO 11898-2, here, however in the variations for data transmission at a higher date between infotainment devices. Alternatively, Ethernet is also used for networking components in the vehicle. The gateway 140 is provided for the purpose of transmitting the vehicle-related sensor data via the communication module 110 to another vehicle or to another central computer. The gateway is connected to the two different bus systems 102 and 104. The gateway 140 is designed to convert the data which it receives via the CAN bus 104 in such a way that the data is converted into the transmission format of the high-speed CAN bus 102, so that the data may be distributed in the packets specified there. For routing these data externally, the communication module is 110 also equipped to receive these data packets and in turn to convert them into the transmission format of the correspondingly used communication standard. The gateway 140 may also be used as a computation mechanism for other tasks.

Figure 4:
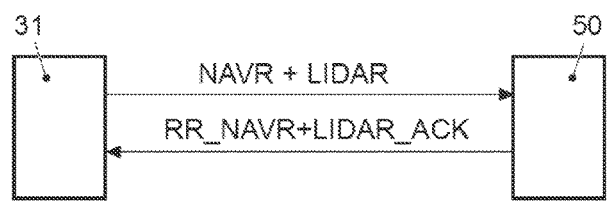
FIG. 4 shows the data exchange between the vehicle and a mobile telephone network management unit in the case that the vehicle is equipped with a lidar sensor.

In a typical application case of the present disclosure, a vehicle 30 reports its planned travel route to the central computer 50. The transmission of the planned travel route from the on-board unit 31 to the central computer 50 is depicted in FIG. 4. In addition to the travel route, the vehicle 30 notifies the central computer 50 that it is equipped with a lidar sensor 105. There, the message for communicating the travel route and the special lidar equipment is denoted by the reference characters NAVR+LIDAR. The information about the special equipment may also be reported separately without transmitting the travel route to the central computer 50. The planned time at which the travel route is started is also part of the transmission of the travel route. This is important for resource planning in the central computer 50. Optionally, a service request may be transferred during the transmission of the route information. For example, a certain quality of service (QoS) for the travel route may be requested via such service requests. In the case of FIG. 4, it is assumed that the travel route is started at a time at which the daily, weekly, and monthly cycles indicate no bottlenecks in the provision of network resources. In contrast to the conventional daily, weekly, and monthly cycles, according to the proposed approach, it is provided that additional vehicles report their planned travel routes to the central computer. Thus, the forecast about the expected traffic and network utilization is more accurate. If no bottleneck is displayed, the central computer 50 returns a confirmation to the on-board unit 31 of the vehicle 30. The confirmation message is indicated in FIG. 4 by the reference characters RR_NAVR+LIDAR_ACK. The confirmation message confirms that it is possible to plan appropriate network resources temporally and spatially for the planned travel route A, and that the information about the special equipment is taken into account for the handover process.

Figure 5:
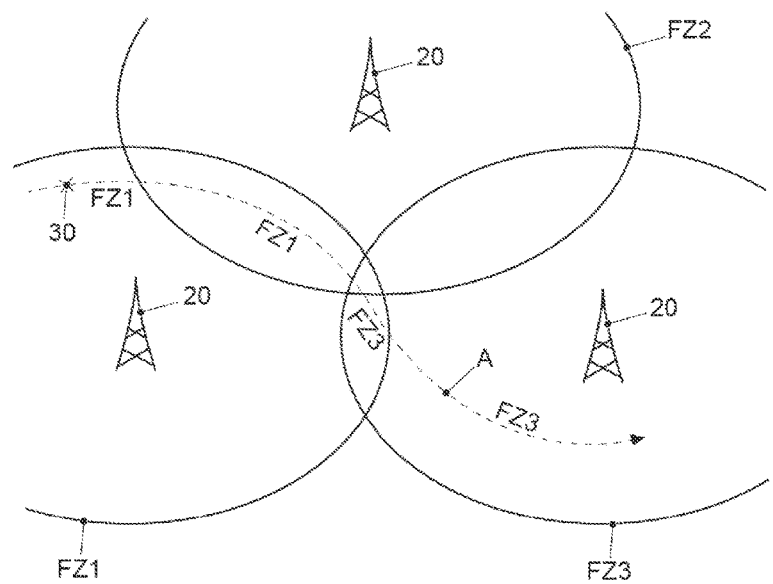
FIG. 5 shows the sequence of the handover process in an exemplary embodiment if the vehicle is equipped with a lidar sensor.

Based on FIG. 5, an example of a handover process will now be explained taking into account the information with respect to the special equipment. Three mobile radio cells FZ1 to FZ3 are involved. The vehicle moves along its travel route A. Registration is carried out with the base station of mobile radio cell FZ1. The information about the travel route and the special equipment has been transmitted from the central computer 50 to the BSCs along the travel route A. If the vehicle 30 now approaches the cell boundary of mobile radio cell FZ2, the handover process starts. Although the reception signal from the base station 20 of mobile radio cell FZ2 becomes stronger and a handover to mobile radio cell FZ2 is accordingly indicated, the vehicle 30 remains in mobile radio cell FZ1, because it is known to the BSC that the vehicle 30 is equipped with a lidar sensor 105, and a large amount of resources must be reserved for transferring the data of the lidar sensor 105. Therefore, the switchover to mobile radio cell FZ2 is prevented because the capacity of the cell is already largely utilized in the case under consideration. The handover process to mobile radio cell FZ3 takes place only when the vehicle has reached the cell boundary of mobile radio cell FZ3. In the case under consideration, there are sufficient resources here for transferring the data of the lidar sensor 105.

Figure 6:
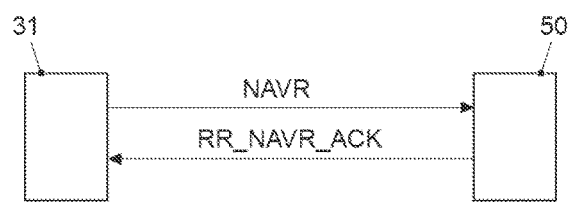
FIG. 6 shows the message exchange between the vehicle and a mobile telephone network management unit in the case that the vehicle is not equipped with a lidar sensor.

FIG. 6 shows the case in which the vehicle 30 registers only the travel route A with the central computer 50. In this case, the vehicle 30 is not specially equipped with a lidar sensor 105. The message via which the travel route is transmitted to the central computer 50 is indicated by NAVR. The central computer 50 confirms receipt of the travel route and the corresponding resource reservation along the route with the message RR_NAVR_ACK.

Figure 7:
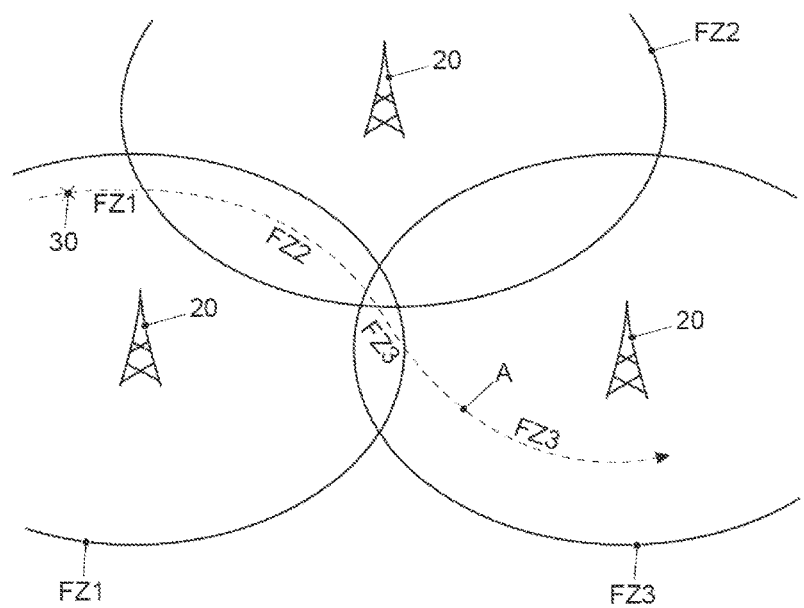
FIG. 7 shows the sequence of the handover process in an exemplary embodiment if the vehicle is not equipped with a lidar sensor.

FIG. 7 illustrates the sequence of the handover process for this case. If the vehicle 30 approaches the cell boundary of mobile radio cell FZ2, the handover process starts again. In this case, the cell switchover to mobile radio cell FZ2 takes place if the reception signal reaches the required strength. Subsequently, an additional handover process takes place with a switchover to mobile radio cell FZ3. In this case, no special equipment with a lidar sensor 105 was actually reported, so that it may be assumed that mobile radio cell FZ2 is not overloaded by the registration of vehicle 30.

During the handover process, if there is no longer any mobile radio available which can transmit the data about the special equipment, a buffer memory may be provided in the subscriber station, in which the data are temporarily buffered until transfer to a further handover process is possible.

Of course, any other special equipment may be taken into account for the handover process in a similar manner. Sensors which provide a large quantity of data also include, for example, camera sensors and radar sensors.

The information about the special equipment may be transmitted directly to a handover control unit 42 by the mobile telephone network subscriber station before or during the handover process, and then taken into account therein during the handover process. The handover control unit 42 may be localized in the EPC 40 and is then responsible for one or multiple adjacent mobile radio cells.

The decision during the handover process as to whether the transfer to mobile radio cell FZ2 takes place may be made a function of whether the vehicle is currently using the special equipment. Only then are the resources actually needed. However, one strategy may be that the resources are earmarked for the equipped vehicle, and the handover process thus always takes place taking into account the special equipment, because the possibility exists that the sensor will be activated at any time.

It should be understood that the proposed method and the associated devices may be implemented in various forms of hardware, software, firmware, special processors, or a combination thereof. Special processors may comprise application-specific integrated circuits (ASICs), reduced-instruction set computers (RISC), and/or field-programmable gate arrays (FPGAs). Optionally, the proposed method and the device are implemented as a combination of hardware and software. The software may be installed as an application program on a program storage device. This is typically a machine based on a computer platform which includes hardware, for example, one or multiple central processing units (CPUs), a direct-access memory (RAM), and one or multiple input/output (I/O) interface(s). In addition, an operating system is typically installed on the computer platform. The various processes and functions which have been described here may be part of the application program, or a portion which is executed via the operating system.

The disclosure is not limited to the exemplary embodiments described here. There is room for various adaptations and modifications which those skilled in the art would also take into account as belonging to the disclosure, on the basis of their expert knowledge.

LIST OF REFERENCE CHARACTERS

10 Internet
20 Base station
20a Base station
20b Base station
30 Mobile telephone network subscriber station
31 Mobile telephone network communication module
40 Evolved packet core EPC
42 Handover/control unit
50 Mobile telephone network management unit
100 Block diagram of vehicle electronic system
102 High-speed CAN bus
105 Lidar sensor
104 CAN bus
110 On-board unit
120 Navigation system
130 User interface arrangement
140 Gateway
151 Engine control unit
152 ESP control unit
153 ABS control unit
161 Sensor 1
162 Sensor 2
163 Sensor 3
A Travel route
FZ1 Radio cell 1
FZ2 Radio cell 2
FZ3 Radio cell 3

The invention claimed is:

1. A method for transferring a mobile telephone network subscriber station between mobile telephone network radio base stations during a handover process in a mobile telephone network, the method comprising:
   transmitting transportation vehicle sensor information, along with information about a planned route to be traveled by the transportation vehicle, from the mobile telephone network subscriber station to a mobile telephone network management unit;
   evaluating the transportation vehicle sensor information by the mobile telephone network management unit; and
   transmitting the transportation vehicle sensor information from the mobile telephone network management unit to handover control units associated with radio base stations along the planned route,
   wherein the transportation vehicle sensor information transmitted to the handover control units is taken into account during a handover process for the mobile telephone network subscriber station to determine a most suitable mobile radio cell to transfer the mobile telephone network subscriber station to during the handover process.

2. The method of claim 1, wherein transfer of the mobile telephone network subscriber station to a mobile radio cell known to be unsuitable for transmission of transportation vehicle sensor information is prohibited based on availability of multiple mobile radio cells during the handover process.

3. The method of claim 2, wherein the mobile radio cell determination of unsuitability for the transmission of the transportation vehicle sensor information is based on available transmission capacity in the mobile radio cell relative to an amount of information to be transmitted from the transportation vehicle sensor.

4. The method of claim 1, wherein the transportation vehicle sensor information of the mobile telephone network subscriber station is linked to information about a priority, wherein the information about the priority is taken into account during the handover process so that network resources are allocated to the mobile telephone network subscriber station.

5. A mobile telephone network subscriber station comprising: a mobile radio communication module for the transmission and the reception of messages via a mobile radio system, wherein mobile telephone network communication module transmits the transportation vehicle sensor information of the mobile telephone network subscriber station to the mobile telephone network management unit; and
 a buffer memory in which the data generated by the transportation vehicle sensor are buffered during the handover process in response to no mobile radio cell is suitable for transmitting the data about the transportation vehicle,
 wherein the mobile telephone network subscriber station is transferred during the handover process in the mobile telephone network by transmitting information about the transportation vehicle, along with information about a planned route to be traveled, from the mobile telephone network subscriber station to the mobile telephone network management unit, evaluating the transportation vehicle sensor information by the mobile telephone network management unit, and transmitting the transportation vehicle sensor information of the mobile telephone network subscriber station from the mobile telephone network management unit to the handover control units associated with radio base stations along the planned route which is associated with mobile radio base stations, wherein the transportation vehicle sensor information transmitted to the handover control units associated with radio base stations is taken into account during the handover process for the mobile telephone network subscriber station to determine a most suitable mobile radio cell to transfer the mobile telephone network subscriber station to during the handover process.

6. The mobile telephone network subscriber station of claim 5, wherein transfer of the mobile telephone network subscriber station to a mobile radio cell known to be unsuitable for transmission of the transportation vehicle sensor information is prohibited based on availability of multiple radio cells during the handover process.

7. The mobile telephone network subscriber station of claim 6, wherein the mobile radio cell determination of unsuitability for the transmission of the transportation vehicle sensor information is based on available transmission capacity in the mobile radio cell relative to transmission amount of the transportation vehicle sensor information.

8. The mobile telephone network subscriber station of claim 5, wherein the transportation vehicle sensor information of the mobile telephone network subscriber station is linked to information about a priority, wherein the information about the priority is taken into account during the handover process so that the network resources are allocated to the mobile telephone network subscriber station.

9. A transportation vehicle, wherein a mobile telephone network subscriber station according to claim 5 is integrated into the vehicle.

10. The transportation vehicle of claim 9, wherein the transportation vehicle sensor information corresponds to information about sensor equipment of the vehicle.

11. A mobile telephone network management unit comprising a transceiver unit for exchanging messages with a mobile telephone network subscriber station, wherein the mobile telephone network management unit receives planned route information and transportation vehicle sensor information from the mobile telephone network subscriber station, wherein the mobile telephone network management unit transmits the information about the transportation vehicle sensor to the handover control units along the planned route which are associated with the mobile radio stations wherein the transportation vehicle sensor information transmitted to the handover control units associated with radio base stations is taken into account during the handover process for the mobile telephone network subscriber station to determine a most suitable mobile radio cell to transfer the mobile telephone network subscriber station to during the handover process.

* * * * *